(12) United States Patent
Roach et al.

(10) Patent No.: US 12,181,421 B2
(45) Date of Patent: Dec. 31, 2024

(54) TEST CAPSULES FOR MEASURING A CHANGE IN AT LEAST ONE PROPERTY OF A MATERIAL, AND RELATED METHODS

(71) Applicants: Battelle Energy Alliance, LLC, Idaho Falls, ID (US); Board of Regents, The University of Texas System, Austin, TX (US)

(72) Inventors: Robert A. Roach, Idaho Falls, ID (US); Andrea M. Jokisaari, Idaho Falls, ID (US); Michael D. McMurtrey, Idaho Falls, ID (US); Geoffrey L. Beausoleil, Idaho Falls, ID (US); Carolyn L. Seepersad, Austin, TX (US)

(73) Assignees: Battelle Energy Alliance, LLC, Idaho Falls, ID (US); Board of Regents, The University of Texas System, Austin, TX (US)

( * ) Notice: Subject to any disclaimer, the term of this patent is extended or adjusted under 35 U.S.C. 154(b) by 269 days.

(21) Appl. No.: 17/808,944

(22) Filed: Jun. 24, 2022

(65) Prior Publication Data
US 2023/0010473 A1    Jan. 12, 2023

Related U.S. Application Data

(60) Provisional application No. 63/203,072, filed on Jul. 7, 2021.

(51) Int. Cl.
*G01N 23/00* (2006.01)
(52) U.S. Cl.
CPC .................................. *G01N 23/00* (2013.01)

(58) Field of Classification Search
CPC ....................................................... G01N 23/00
See application file for complete search history.

(56) References Cited

U.S. PATENT DOCUMENTS

| 2006/0034415 A1* | 2/2006 | Tsang ...................... G21H 1/04 |
| | | 376/320 |
| 2009/0285350 A1 | 11/2009 | Cantonwine et al. |
| 2020/0239984 A1* | 7/2020 | Lu ........................... G21F 1/085 |
| 2020/0303083 A1* | 9/2020 | Wang ...................... G21C 3/07 |

OTHER PUBLICATIONS

Blattmann et al. "Characterisation of Reinforced Body Centered Cuibic, Octahedra-Type and Octet Truss Lattice Structures" Reinforced Body Centered Cubic, Procedia CIRP 84 (2019) 38-42.
Chen et al. "Hierarchical honeycomb lattice metamaterials with improved thermal resistance and mechanical properties" Composite Structures 152 (May 2016) 395-402.
(Continued)

*Primary Examiner* — Nicole M Ippolito
(74) *Attorney, Agent, or Firm* — TraskBritt

(57) ABSTRACT

A test capsule for measuring at least one property of a material exposed to nuclear radiation comprises a lattice structure configured to exhibit a change in at least one property responsive to exposure to nuclear radiation. The lattice structure comprises a first strut and a second strut connected to the first strut at a node. Related test capsules and methods are also described.

21 Claims, 8 Drawing Sheets

(56) References Cited

OTHER PUBLICATIONS

Correa et al. "Negative stiffness honeycombs for recoverable shock isolation", Rapid Prototyping Journal, vol. 21 Issue 2 pp. 193-200 (Accepted Dec. 29, 2014).
Debeau et al. "Impact behavior of negative stiffness honeycomb materials" Mechanical Engineering Department, The University of Texas at Austin, Invited Article, (Dec. 2017) 10 pages.
Dede et al. "Computational analysis and design of lattice structures with integral compliant mechanisms" Finite Elements in Analysis and Design 44 (Accepted Jun. 23, 2008) pp. 819-830.
Dollins et al. "Irradiation Induced Primary Creep" AEC Research and Development Report (Apr. 1974) 32 pages.
Dong et al. "Mechanical response of Ti—6Al—4V octet-truss lattice structures" International Journal of Solids and Structures 60-61 (Available online Feb. 19, 2015) pp. 107-124.
Dressler et al. "Heterogeneities dominate mechanical performance of additively manufactured metal lattice struts" Additive Manufacturing 28 (Jun. 2019) 692-703.
Gaynor et al. "Multiple-Material Topology Optimization of Compliant Mechanisms Created Via PolyJet Three-Dimensional Printing" Journal of Manufacturing Science and Engineering, vol. 136 (Dec. 2014) 10 pages.
Huang et al. "Negative Poisson's Ratio in Modern Functional Materials" Adv. Mater. 2016, 28, 8079-8096.
Khurana et al. "Design for Additive Manufacturing of Cellular Compliant Mechanism Using Thermal History Feedback" Proceedings of the ASME 2018 International Design Engineering Technical Conferences and Computers and Information in Engineering Conference, Aug. 26-29, 2018, Quebec City, Quebec, Canada.
Kumar et al. "On topology optimization of large deformation contact-aided shape morphing compliant mechanisms" arXiv:2006.07207v2 [cs.CE] Oct. 22, 2020 (19 pages).
Maconachie et al. "SLM lattice structures: Properties, performance, applications and challenges" Materials and Design 183 (Aug. 2019) 108137, 18 pages.
Matisse "Analysis and assessment of mechanisms of irradiation creep" MatISSE-D2.41-revision 1 issued on Apr. 29, 2015, 110 pages.
Morris et al. "Tunable Mechanical Metamaterial with Constrained Negative Stiffness for Improved Quasi-Static and Dynamic Energy Dissipation" Adv. Eng. Mater. 2019, 1900163; 8 pages (Revised: Mar. 20, 2019).
Pan et al. "Design and Optimization of Lattice Structures: A Review" Appl. Sci. 2020, 10, 6374 (Sep. 2020).
Roy et al. "Irradiation behaviour of nuclear fuels" Pram~na, vol. 24, Nos. 1 & 2, Jan. & Feb. 1985, pp. 397-421.
Santer et al. "Topological Optimization of Compliant Adaptive Wing Structure" AIAA Journal vol. 47, No. 3 (Mar. 2009) pp. 523-534.
Sarvestani et al. "Architectured ceramics with tunable toughness and stiffness" Extreme Mechanics Letters 39 (Jun. 2020) 100844, 14 pages.
Sarvestani et al. "Engineered bi-material lattices with thermo-mechanical programmability" Composite Structures 263 (Feb. 2021) 13 pages.
Seepersad et al. "An experimental approach for enhancing the predictability of mechanical properties of additively manufactured architected materials with manufacturing-induced variability" mechanical Engineering Department, The University of Texas at Austin, Austin, Texas, 29 pages.
Seepersad et al. "Robust Design of Cellular Materials With Topological and Dimensional Imperfections" Journal of Mechanical Design, (Nov. 2006, vol. 128, pp. 1285-1297.
Sharp et al. "Lattice Structure Optimization with Orientation-Dependent Material Properties" Research Paper (40 pages).
Tahseen et al. "Development of an Elastic Material Model for BCC Lattice Cell Structures Using Finite Element Analysis and Neural Networks Approaches" J. Compos. Sci. (Published Apr. 1, 2019) 3, 33.
Tiziani "Optical methods for precision measurements" Optical and Quantum Electronics 21 (1989) pp. 253-282 (Received Dec. 5, 2988).
Wolfer et al. "Theory of Swelling and Irradiation Creep" Article (Jan. 1, 1977).
Zhao et al. "Using Rigid-Body Mechanism Topologies to Design Shape-Changing Compliant Mechanisms" Journal of Mechanisms and Robotics, vol. 8 (Feb. 2016) 9 Pages.

* cited by examiner

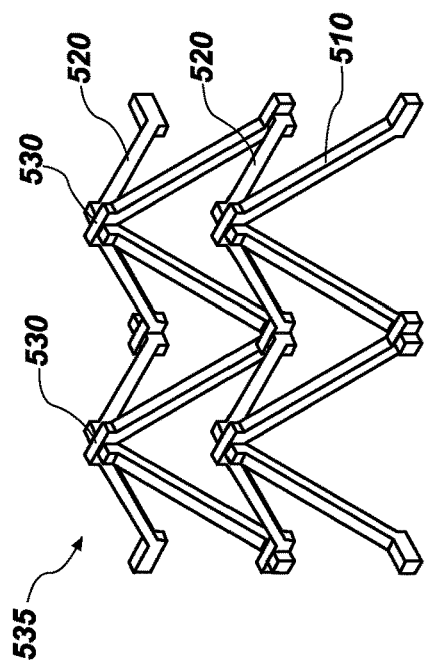
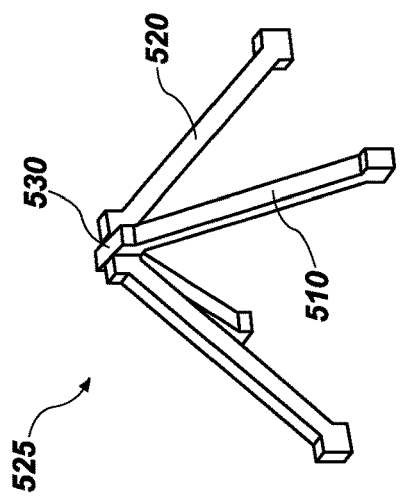
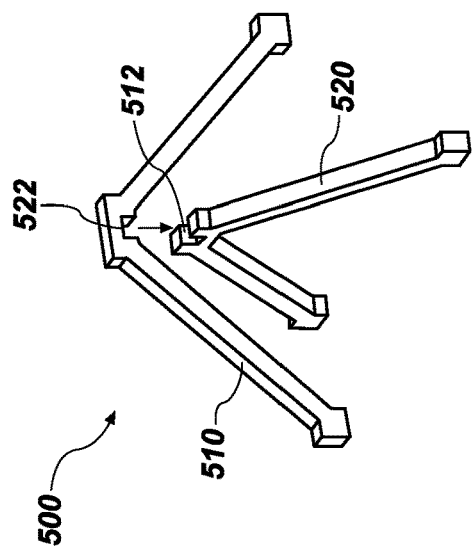
FIG. 5A
FIG. 5B
FIG. 5C

TEST CAPSULES FOR MEASURING A CHANGE IN AT LEAST ONE PROPERTY OF A MATERIAL, AND RELATED METHODS

CROSS-REFERENCE TO RELATED APPLICATION

This application claims the benefit under 35 U.S.C. § 119(e) of U.S. Provisional Patent Application Ser. No. 63/203,072, filed Jul. 7, 2021, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to a test capsule for measuring one or more properties of an encapsulated material, and to related methods. More particularly, embodiments of the disclosure relate to test capsules including one or more lattice structures configured to exhibit an amplified response to exposure to one or more conditions within a nuclear reactor, and to related methods of measuring one or more time-dependent properties, such as irradiation assisted creep.

BACKGROUND

Generation of power by nuclear fuel includes the generation of heat, such as by fission of nuclear fuel materials within a nuclear reactor core and decay of fission and neutron activation products. Heat generated in the nuclear reactor core is removed from the nuclear reactor core by circulation of a heat transfer fluid (e.g., working fluid, also referred to as a coolant) to create a heated fluid that, in turn, is used to generate power. For example, the heat transfer fluid may comprise water (e.g., liquid water) that cools the reactor core to generate steam. The steam may pass through a turbine coupled to an electric generator to generate electricity. After passing through the turbine, the steam may at least partially condense and/or pass through a condenser to condense the steam to liquid water. The liquid water is reheated by the nuclear reactor core to repeat the cycle of heat removal from the nuclear reactor core to generate steam, and power generation from the steam.

Advanced nuclear reactors are designed to improve one or more characteristics of traditional nuclear reactors. Advanced nuclear reactors may include, for example, small modular reactors (SMR), reactors capable of more quickly adjusting electricity output to match demand compared to conventional reactors, reactors that utilize a variety of coolant materials (e.g., water, molten salt, high temperature gas and liquid metal), and reactors that provide electricity and, for example, clean water (e.g., potable water), hydrogen, or heat.

Conditions within advanced nuclear reactors include exposure to radiation, high temperatures, and corrosion conditions. The development of advanced nuclear reactors requires materials capable of withstanding the harsh environments of the advanced nuclear reactors. For example, radiation damage to structures of the nuclear reactor occurs as energetic particles (e.g., neutrons, ions, protons, electrons, a particles) interact with solid materials. Radiation induced microstructural damage degrades material properties, such as by irradiation creep, irradiation induced swelling, radiation hardening and embrittlement, and reduction in fatigue performance of the materials.

Creep is the tendency of a solid material to permanently deform under the influence of persistent mechanical stress and can occur as a result of long-term exposure to high levels of stress that are below the yield strength of the material. Creep is a time-dependent deformation process and is typically activated in a specific temperature range under the presence of stress. The temperature range varies based on the material, but generally increases as the temperature nears the melting temperature of the material. In some instances, creep may be accelerated or induced at temperatures lower than the melting temperature by irradiation through enhanced material defect production, also referred to as "irradiation assisted creep." Irradiation assisted creep is a gradual change in the shape of a material in response to applied irradiation in addition to ordinary thermal creep. The applied stress causes the evolving microstructure to respond in an anisotropic fashion to the interstitial and vacancy fluxes.

Deployment of new materials in reactor systems is time consuming because material selection and long-term creep testing are the most common solution to manage the effects of irradiation assisted creep. However, because irradiation assisted creep is a time-dependent phenomenon, use of new materials in reactor designs is hindered by the length of time required for qualification of new materials.

BRIEF SUMMARY

Embodiments disclosed herein include methods and structures for qualifying a material for use in an environment, such as in a nuclear reactor. For example, in accordance with one embodiment, a test capsule for measuring a change in at least one property of a material responsive to exposure to nuclear radiation comprises a shell defining a volume, and at least one lattice structure within the volume and configured to exhibit a change in at least one property responsive to exposure to nuclear radiation.

In accordance with other embodiments, a test capsule for measuring at least one property of a material exposed to nuclear radiation comprises at least one lattice structure configured to exhibit a change in at least one property responsive to exposure to nuclear radiation. The at least one lattice structure comprises a first strut, and a second strut connected to the first strut at a node.

In further embodiments, a method of measuring at least one property comprises placing at least one lattice structure within a test capsule, the at least one lattice structure comprising struts connected to nodes, disposing the test capsule in a nuclear reactor and exposing the test capsule to radiation for a duration of time, after the duration of time, removing the test capsule from the reactor, and measuring a displacement of at least one of the struts of the at least one lattice structure to measure the at least one property of the at least one lattice structure.

BRIEF DESCRIPTION OF THE DRAWINGS

FIG. 5A is a simplified partial perspective view of a snap-through structure comprising a first truss configured to snap-through to a second truss, in accordance with embodiments of the disclosure;

FIG. 5B is a simplified perspective view of a snap-through cell wherein the first truss of FIG. 5A is connected (e.g., snap-through) to the second truss of FIG. 5A, in accordance with embodiments of the disclosure;

FIG. 5C is a simplified perspective view of a snap-through lattice structure after connecting several of the first trusses to corresponding second trusses of FIG. 5A, in accordance with embodiments of the disclosure;

DETAILED DESCRIPTION

Figure 1:
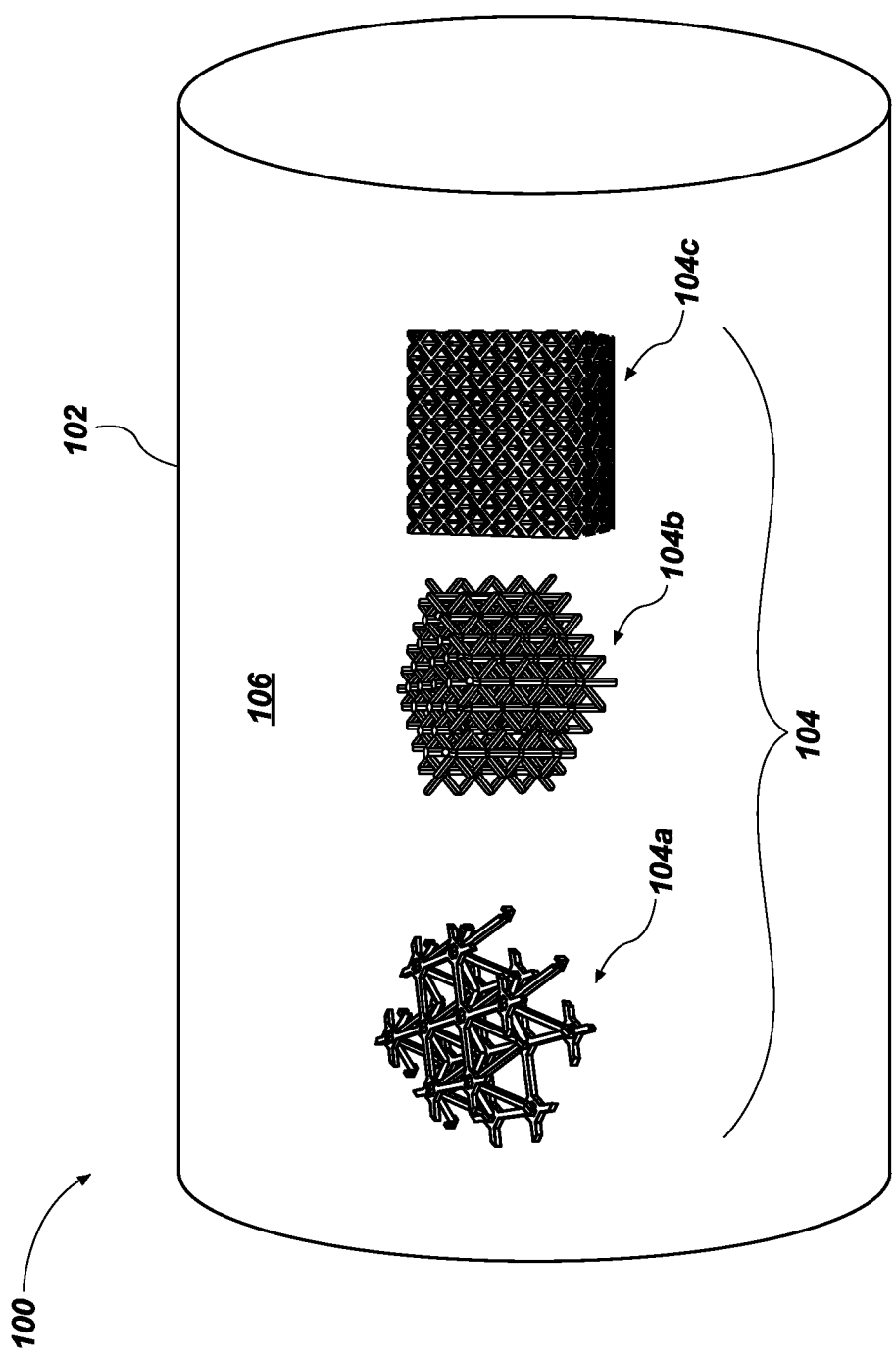
FIG. 1 is a simplified partial schematic of a test capsule including one or more lattice structures, in accordance with embodiments of the disclosure.

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, system, or method for forming a lattice structure or a test capsule (e.g., a test artifact) comprising one or more lattice structures. Only those process acts and structures necessary to understand the embodiments of the disclosure are described in detail below. Additional acts to form a lattice structure or a test capsule may be performed by conventional techniques. Further, any drawings accompanying the present application are for illustrative purposes only and, thus, are not drawn to scale. Additionally, elements common between figures may retain the same numerical designation.

According to embodiments described herein, a lattice structure is configured to exhibit a response to exposure to one or more conditions. The response of the lattice structure to the one or more conditions may be correlated to an extent of exposure of the lattice structure to the one or more conditions. The size, shape, and geometry of the lattice structure (e.g., individual cells of the lattice structure) may be tailored to amplify the response of the lattice structure (e.g., the individual cells of the lattice structure) to the one or more conditions and facilitate improved measurement and analysis of time-dependent effects. For example, the lattice structure may be sized, shaped, and configured to exhibit a relatively increased response to exposure to one or more conditions, such as irradiation, compared to structures with conventional geometries (e.g., cylindrical tubes and piping, plate metal). The response of the lattice structure may comprise one or more of a displacement of the lattice structure, a displacement of one or more cells of the lattice structure, a displacement of one or more struts of a cell of the lattice structure, a relative displacement of one or more struts of one or more cells of the lattice structure relative to one or more additional struts of the one or more cells or one or more additional cells of the lattice structure, a change in shape of the lattice structure, a change in shape of one or more cells of the lattice structure, a change in volume of the lattice structure, and a change in volume of one or more cells of the lattice structure, responsive to exposure to the one or more conditions (e.g., radiation). In some embodiments, one or both of neighboring unit cells and neighboring struts of the lattice structure are formed of different material compositions. In some such embodiments, at least one of the neighboring struts comprises a material exhibiting a piezoelectric response (e.g., a piezoelectric material) and the displacement is measured by measuring an electrical property (e.g., a voltage, a resistance) of the at least one neighboring strut.

In some embodiments, neighboring struts of unit cells of the lattice structure are configured to exhibit a response (e.g., a displacement) responsive to one or more conditions. In some embodiments, the response of the neighboring struts is configured to be in the same direction. In other embodiments, the response of the neighboring struts are configured to be opposite one another. In some such embodiments, by measuring the displacement (e.g., the relative displacement) of the neighboring struts, the response of the lattice structure to the one or more conditions is amplified. The response of the lattice structure and/or one or more cells of the lattice structure may be amplified (e.g., greater than) relative to the response of another structure comprising the same material composition as the lattice structure (e.g., a solid structure).

The lattice structure may be used to analyze the effects of radiation exposure on the material from which the lattice structure is formed and to test the response of the material to time-dependent effects such as creep, irradiation assisted creep, fatigue, stress corrosion cracking, radiation damage, breakaway growth, irradiation induced swelling, deformation rates (e.g., displacement rates, such as elongation rates, rates of shortening), radiation hardening and embrittlement, additional radiation effects, and one or more additional properties. In some embodiments, the lattice structure is configured to facilitate testing of a material from which the lattice structure is formed (e.g., a material from which at least a portion of the lattice structure is formed) for irradiation assisted creep. The amplified response may reduce the time required for material qualification for time-dependent effects, such as irradiation assisted creep. In some embodiments, one or more lattice structures are placed within a test capsule that is, in turn, exposed to one or more reactor conditions (e.g., radiation, elevated temperature). The response of the one or more lattice structures may be accelerated (e.g., amplified) and measured to quantify the lattice structures for use in an environment having similar conditions to which the test capsule was exposed (e.g., a nuclear reactor). In some embodiments, the response of the one or more lattice structures is measured after the test capsule is removed from the one or more reactor conditions. By way of comparison, conventional material qualification for properties such as irradiation assisted creep requires post irradiation examination (PIE) and may require multiple years of radiation exposure prior to post irradiation examination. The lattice structures described herein obviate the extensive time requirement of radiation exposure since the response of the lattice structures to radiation is amplified.

As used herein, a "lattice structure" means and includes a topologically ordered, three-dimensional open-celled structure composed of one or more repeating unit cells, the unit cells defined by dimensions and connectivity of their constituent struts and/or plate elements. The one or more repeating unit cells may be consecutively and repeatedly arranged into interconnected cells. In some embodiments, lattice structures may be a porous (e.g., hollow) material structure composed of the interconnected struts and nodes in three-dimensional space. The lattice structures comprise an interconnected network of struts and/or plates, the struts and/or plates connected at nodes. In some embodiments, the lattice structures comprise a gradient in one or more properties of the lattice cells (e.g., density, length, height, width). In some instances, lattice structures differ from foams by the periodic (e.g., regular) repeating structure of the unit cells of the lattice structure. Lattice structures may also be referred to as structural metamaterials or truss materials.

FIG. 1 is a simplified partial schematic of a test capsule 100 including one or more lattice structures, in accordance with embodiments of the disclosure. The test capsule 100 includes a shell 102 defining an outer surface of the test capsule 100. One or more lattice structures 104 may be located within a volume 106 defined by the shell 102. In some embodiments, the volume 106 is substantially sealed from an external environment. In other words, the shell 102 may substantially completely enclose the volume 106. In other embodiments, the volume 106 is not sealed and the lattice structures 104 may be exposed to an external environment.

The shell 102 may comprise one or more materials suitable for use in a nuclear reactor. By way of non-limiting example, the shell 102 may be formed of and include one or more of aluminum, stainless steel, zircaloy, graphite, or another material.

The lattice structures 104 located within volume 106 may include one or more different types of lattice structures, such as a first lattice structure 104a, a second lattice structure 104b, and a third lattice structure 104c. The first lattice structure 104a, the second lattice structure 104b, and the third lattice structure 104c may collectively be referred to herein as the lattice structures 104. In some embodiments, neighboring lattice structures 104 may be spaced from each other by a gap to facilitate volume expansion of the lattice structures 104. In other words, neighboring lattice structures 104 may not directly contact one another. For example, the first lattice structure 104a may be spaced from the second lattice structure 104b. In other embodiments, neighboring lattice structures 104 are not spaced from each other by a gap and directly contact one another. For example, the second lattice structure 104b may directly contact the third lattice structure 104c.

Although FIG. 1 illustrates only three (3) lattice structures 104, the disclosure is not so limited. In other embodiments, the test capsule 100 includes fewer lattice structures 104, such as two (2) lattice structure 104, or one (1) lattice structure. In other embodiments, the test capsule 100 includes a greater quantity of lattice structures 104, such as greater than three (3) lattice structures 104, greater than four (4) lattice structures, greater than eight (8) lattice structures 104, greater than twelve (12) lattice structures, or even greater than twenty (20) lattice structures 104.

Each of the first lattice structure 104a, the second lattice structure 104b, and the third lattice structure 104c may exhibit one or more different properties than the other of the first lattice structure 104a, the second lattice structure 104b, and the third lattice structure 104c. For example, one or more of a geometry of the unit cells, a unit cell size, a unit cell shape, a strut length, a strut dimension (e.g., diameter), a cell density, a ratio between a length of the struts and the dimension of the struts, and one or more additional properties of each of the first lattice structure 104a, the second lattice structure 104b, and the third lattice structure 104c may differ from a corresponding property of the other of the first lattice structure 104a, the second lattice structure 104b, and the third lattice structure 104c. In some embodiments, at least one of the first lattice structure 104a, the second lattice structure 104b, and the third lattice structure 104c comprises a different material composition than at least one other of the first lattice structure 104a, the second lattice structure 104b, and the third lattice structure 104c. In some such embodiments, the at least one of the first lattice structure 104a, the second lattice structure 104b, and the third lattice structure 104c exhibits the same geometry as the at least one other of the first lattice structure 104a, the second lattice structure 104b, and the third lattice structure 104c. In other embodiments, the at least one of the first lattice structure 104a, the second lattice structure 104b, and the third lattice structure 104c exhibits a different geometry than the at least one other of the first lattice structure 104a, the second lattice structure 104b, and the third lattice structure 104c.

The lattice structures 104 may be sized, shaped, and configured to exhibit one or more physical changes responsive to exposure to one or more conditions to which the test capsule 100 is exposed. In some embodiments, the lattice structures 104 are configured to exhibit a change in at least one geometric property responsive to exposure to radiation. In some embodiments, the lattice structures 104 exhibit a change of shape or a change in volume that may be an indication of irradiation assisted creep. The change of shape or volume may be measured optically to quantify the irradiation assisted creep. The lattice structures 104 may be configured to exhibit a maximum response (e.g., a maximum change (e.g., increase) of shape, a maximum change (e.g., increase) of volume, or both) responsive to exposure to radiation. In some embodiments, at least some of the lattice structures 104 or at least a component (e.g., a strut) of the at least some of the lattice structures 104 comprise a different material composition than at least others of the lattice structures 104. In some embodiments, at least one of the lattice structures 104 and/or at least a component of the at least one of the lattice structures 104 comprises a piezoelectric material formulated and configured to exhibit a change in voltage responsive to deformation thereof (e.g., responsive to a change in a length thereof). By way of non-limiting example, the one or more piezoelectric lattice structures 104 comprises one or more of aluminum nitride, barium titanate (BaTiO$_3$), lithium niobate (LiNbO$_3$), lithium tantalate (LiTaO$_3$), zinc oxide (ZnO), lead zirconate titanate (Pb[Zr$_{(x)}$Ti$_{(1-x)}$]O$_3$) (PZT), barium strontium titanate (Ba$_x$Sr$_{(1-x)}$TiO$_3$) (BST), aluminum phosphate (AlPO$_4$) (berlinite), and Wirtzite structured materials (e.g., one or more of boron nitride (BN), zinc sulfide (ZnS), silver iodide (AgI), zinc oxide (ZnO), cadium sulfide (CdS), cadmium selenide (CdSe), silicon carbide (SiC, such as alpha phase silicon carbide), gallium nitride (GaN), and aluminum nitride (AlN)). In some embodiments, the piezoelectric material comprises a ceramic material, such as a ceramic semiconductive material. As described in further detail herein, the piezoelectric material facilitates determination of the displacement of the lattice structure 104 by measurement of at least one electrical property (e.g., a voltage, a resistance) of the piezoelectric material, which may correspond to a mechanical stress to which the piezoelectric material is exposed (e.g., as a result of exposure to irradiation).

By way of non-limiting example, the lattice structures 104 may exhibit a change in at least one of cell size (e.g., cell volume), cell length, cell width, cell height, elongation, strut length, strut dimension (e.g., diameter), cell density, ratio between strut length and strut dimension (e.g., diameter), lattice volume, lattice shape, or another property responsive to exposure to radiation. In some embodiments, the lattice structures 104 exhibit a distortion to one or more of the lattice structure 104, one or more cells of the lattice structures 104, and one or more components of the lattice structure 104 (e.g., one or more struts of the lattice structure 104) responsive to exposure to the one or more conditions. In some embodiments, the lattice structures 104 may exhibit a change in grain orientation, grain boundaries, and precipitate structure responsive to exposure to irradiation. In some embodiments, one or more struts of the lattice structures 104 exhibit a deformation (e.g., a displacement, an elongation, a reduction in length) responsive to exposure to irradiation.

In some embodiments, the lattice structures 104 individually comprise a piezoelectric material configured to exhibit a change in an electrical property (e.g., a voltage, a resistance) responsive to a change in length of the lattice structure 104 in a particular direction. In some such embodiments, the distortion of the lattice structure 104 may be measured by measuring the at least one electrical property (e.g., a voltage, a resistance) of the lattice structure 104.

In some embodiments, the lattice structures 104 exhibit the distortion or the change in the at least one property after the lattice structures 104 are exposed to radiation. By way of non-limiting example, the lattice structures 104 may exhibit particular properties (e.g., cell size, cell length, cell width, cell height, elongation, strut length, strut dimension, strut material density, strut surface roughness, cell density, ratio between strut length and strut dimension) prior to exposure to radiation and at ambient conditions (e.g., atmospheric pressure and ambient temperature (e.g., about 20° C.)) and/or reactor conditions and may exhibit at least one different property after exposure to the radiation and at ambient conditions and/or reactor conditions.

In some embodiments, at least one of the lattice structures 104 comprises a material composition different from a material composition of at least another of the lattice structures 104 neighboring (e.g., in contact with) the at least one of the lattice structures 104. In some embodiments, the at least one of the lattice structures 104 comprises a piezoelectric material.

At least one of the lattice structures 104 is configured to exhibit a response (e.g., a displacement) responsive to exposure to one or more conditions. In some embodiments, the response of the at least one of the lattice structures 104 is configured to be in the same direction as a response of the neighboring one of the lattice structures 104. In some such embodiments, the response of the neighboring lattice structure 104 may at least partially compensate the response of the at least one of the lattice structures 104.

In other embodiments, the response of the at least one of the lattice structures 104 is configured to be opposite (e.g., in the opposite direction) from a response of a neighboring one of the lattice structures 104. In some such embodiments, by measuring the displacement of the neighboring lattice structures 104 or components (e.g., struts) of lattice structures 104, the response of the at least one of the lattice structures 104 to the one or more conditions is amplified. Stated another way, forming the neighboring lattice structures 104 to exhibit the opposing responses facilitates amplification of the response and may be used to accelerate measurement of time-dependent phenomena, such as creep (e.g., irradiation assisted creep).

In some embodiments, a first lattice structure 104a is formed of a piezoelectric material and a second lattice structure 104b neighboring the first lattice structure 104a (e.g., in contact with the first lattice structure 104a) is formed of another material. In some embodiments, the another material comprises substantially the same material composition as the piezoelectric material. In other embodiments, the another material comprises a different material composition than the piezoelectric material. In some embodiments, displacement of the first lattice structure 104a may affect the deformation of the second lattice structure 104b. In some such embodiments, measurement of the deformation (e.g., displacement, elongation, a reduction in length) of the first lattice structure 104a may include determination of the deformation of the second lattice structure 104a.

By way of non-limiting example, elongation of the first lattice structure 104a in a direction of the second lattice structure 104b may affect the displacement of the second lattice structure 104b. The sum of the displacement of the first lattice structure 104a relative to the second lattice structure 104b may be determined by measuring at least one electrical property of the piezoelectric material of the first lattice structure 104a. In some such embodiments, the measurement of time-dependent phenomena may be accelerate by summing the responses of neighboring lattice structures 104.

In some embodiments, the lattice structures 104 exhibit a change in volume, a change in shape, a deformation, a distortion, or combinations thereof responsive to exposure to the radiation. In some embodiments, the change in the volume, the shape, the deformation, or the distortion of the lattice structures 104 may correspond to a creep rate of the lattice structures 104 during exposure to the radiation. The creep rate may be expressed, for example, as a percent of elongation per unit time (e.g., % elongation/hr). In some embodiments, exposure to radiation alters (e.g., damages) the microstructure of the lattice structures 104. Neutron irradiation may change the microstructure of the lattice structures 104 via, for example, radiation-induced segregation of alloying of trace elements, resolution of precipitates, and formation of voids and dislocations in the microstructure resulting in vacancies in the microstructure and interstitial defects. Irradiation-induced changes to the microstructure are dependent upon, for example, the type of irradiating particle, the irradiation flux, the energy spectrum of the irradiation, the total fluence of irradiating particles, and environmental factors such as irradiation temperature, stress state, and the surrounding chemical environment. The neutron irradiation and the presence and/or movement of voids and precipitates in the microstructure may affect the ductile-to-brittle transition temperature, fracture toughness, and mechanical properties of the lattice structure 104. In some embodiments, the movement of such defects under stress results in irradiation creep at lower temperatures than thermal creep. In some embodiments, time-dependent properties (e.g., creep, dislocation climb) of the lattice structures 104 may change responsive to exposure to irradiation due to the radiation effects on the microstructure of the lattice structures 104.

In use and operation, the lattice structures 104 within the test capsule 100 are exposed to one or more conditions within a reactor. After a predetermined duration of time, the test capsule 100 is removed from the reactor and the lattice structures 104 are analyzed for changes in one or more properties, which may correspond to, for example, the extent of irradiation induced creep of the lattice structures 104. In some such embodiments, the one or more properties measured after radiation exposure are compared to the one or more properties measured before the radiation exposure. The duration of time may be within a range from about 1 month to about 24 months, such as from about 1 month to about 3 months, from about 3 months to about 6 months, from about 6 months to about 12 months, from about 12 months to about 18 months, or from about 18 months to about 24 months. However, the disclosure is not so limited and the duration may be different than those described. In other embodiments, the one or more properties are measured in situ while the test capsule 100 is within the reactor and exposed to operating conditions of the reactor.

In some embodiments, the lattice structures 104 may be configured to comprise a compliant mechanism (e.g., a flexible mechanism configured to achieve force and motion transmission through elastic body deformation), a shape-morphing structure, or both and configured to facilitate amplification and/or redirection of motion. In some such embodiments, the lattice structures 104 may be shaped and configured to exhibit a relatively larger change (e.g., increase) in one or more of volume, shape, or distortion responsive to exposure to one or more conditions (e.g., radiation) compared to conventional structures or compared to another of the lattice structures 104 in the test capsule 100. In some embodiments, amplification of a property of a lattice structure 104 means that the lattice structure 104 is sized, shaped, and or configured to exhibit a relatively larger response to exposure to one or more conditions compared to a response of an additional structure formed from the same material composition as the lattice structure 104 when the additional structure (e.g., a solid structure) is exposed to the same one or more conditions for the same duration.

In some embodiments, the test capsule 100 is removed from the reactor and one or more properties of the lattice structures 104 are measured after the test capsule 100 is removed from the reactor. By way of non-limiting example, one or more properties (e.g., a size, a volume, a length, a height, a width) of the lattice structures 104 may be measured, such as optically (e.g., with one or more of laser interferometry, digital image correlation (DIC), holography, or Moire techniques). In some embodiments, the one or more properties may be measured while the test capsule 100 is in the reactor. In some embodiments, the one or more properties may be measured with a camera, such as by DIC, while the test capsule 100 is in a reactor. In other embodiments, the lattice structures 104 may be analyzed while the lattice structures 104 remain in the test capsule 100 (e.g., in situ) by measuring at least one electrical property of at least one of the lattice structures 104 to determine the deformation (e.g., displacement, elongation, a reduction in length) of the at least one lattice structure 104. As described above, the deformation of the at least one lattice structure 104 may also include determination of the deformation of lattice structures 104 neighboring the at least one lattice structure 104. In some embodiments, a voltage across a strut of at least one lattice structure 104 is measured in situ to determine the deformation of the at least one lattice structure 104.

The lattice structures 104 may individually comprise surface-based lattice structures, strut-lattices, and planar-based lattices. The lattice structures 104 may include unit cells having an octet truss unit geometry, a body centered cubic cell (BCC), a reinforced body centered cubic cell (RBCC), a face-centered cubic (FCC) cell, a cubic cell (e.g., a simple cubic cell), a diamond cell, an octahedral cell, a snap-through cell, a honeycomb cell, a compliant mechanism, a composite structure with inset and/or offset cells (e.g., a diamond cell comprised of two interpenetrating FCC lattices, such as a diamond cubic crystal structure cell, or another cell geometry.

Figure 2B:
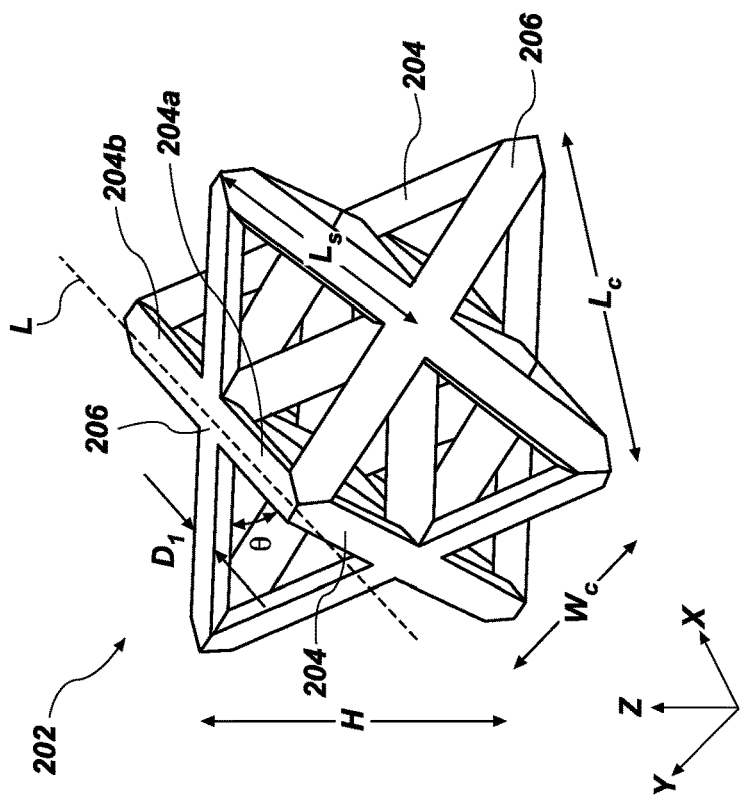
FIG. 2B is a simplified perspective view of a unit cell of the octet truss lattice structure of FIG. 2A, in accordance with embodiments of the disclosure.
Figure 2A:
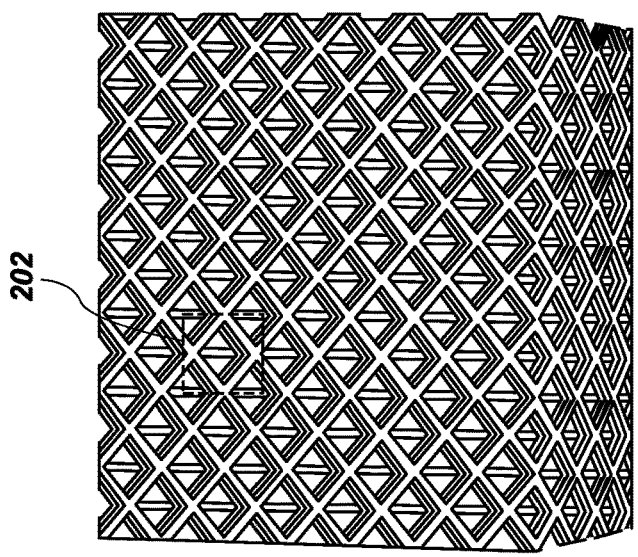
FIG. 2A is a simplified perspective view of an octet truss lattice structure, in accordance with embodiments of the disclosure.

FIG. 2A is a simplified perspective view of a lattice structure 200, in accordance with embodiments of the disclosure. The lattice structure 200 comprises an octet truss lattice structure, which may also be referred to herein as an octet lattice structure. The lattice structure 200 includes a pattern of repeating unit cells 202, one of which is illustrated in a box.

FIG. 2B is a simplified perspective view of one of the unit cells 202 of the lattice structure 200. The unit cell 202 may include a plurality of struts 204 connected to each other at nodes 206. In some embodiments, at least some of the nodes 206 may define an intersection of the unit cell 202 with a neighboring unit cell 202. In some embodiments, at least some of the nodes 206 includes struts 204 from a unit cell 202 and other struts 204 from one or more neighboring unit cells 202. The struts 204 may be connected to each other at the nodes 206. In other words, the nodes 206 may comprise an intersection of two or more of the struts 204. In some embodiments, at least some of the struts 204 and each of the nodes 206 may be located between neighboring unit cells 202. Struts 204 located between neighboring unit cells 202 are illustrated in FIG. 2B as cylindrical rods truncated along the longitudinal axis and include a semi-circular cross-sectional shape. It will be understood that the struts 204 comprise cylindrical rods having a circular cross-sectional shape when neighboring unit cells 202 are placed adjacent one another.

Each unit cell 202 may be defined by a cell length $L_c$, a cell width $W_c$, and a height H. In some embodiments, each repeating unit cell 202 may be described by the cell length $L_c$, the cell width $W_c$, and the height H ($L_c$, $W_c$, H). The cell length $L_c$ may be within a range from about 10 μm to about 40.0 mm (about 4.0 cm), such as from about 10 μm to about 50 μm, from about 50 μm to about 100 μm, from about 100 μm to about 250 μm, from about 250 μm to about 500 μm, from about 500 μm to about 1,000 μm (about 1.0 mm), from about 1.0 mm to about 2.0 mm, from about 2.0 mm to about 3.0 mm, from about 3.0 mm to about 5.0 mm, from about 5.0 mm to about 10.0 mm, from about 10.0 mm to about 20.0 mm, from about 20.0 mm to about 30.0 mm, or from about 30.0 mm to about 40.0 mm. However, the disclosure is not so limited and the cell length $L_c$ may be different than (e.g., less than, greater than) the length $L_c$ described above.

A width $W_c$ of the unit cells 202 may be within a range from about 10 µm to about 40.0 mm, such as from about 10 µm to about 50 µm, from about 50 µm to about 100 µm, from about 100 µm to about 250 µm, from about 250 µm to about 500 µm, from about 500 µm to about 1,000 µm (about 1.0 mm), from about 1.0 mm to about 2.0 mm, from about 2.0 mm to about 3.0 mm, from about 3.0 mm to about 5.0 mm, from about 5.0 mm to about 10.0 mm, from about 10.0 mm to about 20.0 mm, from about 20.0 mm to about 30.0 mm, or from about 30.0 mm to about 40.0 mm. In some embodiments, the width $W_c$ is about the same as the length $L_c$. In other embodiments, the width $W_c$ is less than the length $L_c$. However, the disclosure is not so limited and the cell width $W_c$ may be different than (e.g., less than, greater than) the width $W_c$ described above.

A height H of the unit cells 202 may be within a range from about 10 µm to about 40.0 mm, such as from about 10 µm to about 50 µm, from about 50 µm to about 100 µm, from about 100 µm to about 250 µm, from about 250 µm to about 500 µm, from about 500 µm to about 1,000 µm (about 1.0 mm), from about 1.0 mm to about 2.0 mm, from about 2.0 mm to about 3.0 mm, from about 3.0 mm to about 5.0 mm, from about 5.0 mm to about 10.0 mm, from about 10.0 mm to about 20.0 mm, from about 20.0 mm to about 30.0 mm, or from about 30.0 mm to about 40.0 mm. In some embodiments, the height H is about the same as width $W_c$ and the length $L_c$. In other embodiments, the height H is different from the width $W_c$ and the length $L_c$. However, the disclosure is not so limited and the cell height H may be different than (e.g., less than, greater than) the height H described above.

The struts 204 may exhibit a cylindrical shape, a rod-like shape, a plate shape, a prismatic shape, a cuboid shape (e.g., a beam shape), or another shape. In some embodiments, the struts 204 have a cylindrical shape. In other embodiments, the struts 204 have a cuboid shape. In further embodiments, the struts 204 have a plate shape. In some embodiments, some of the struts 204 have a first shape and other of the struts 204 have a second, different shape.

A dimension (e.g., diameter) $D_1$ of the struts 204 may be within a range from about 1.0 µm to about 20.0 mm, such as from about 1.0 µm to about 10 µm, from about 10 µm to about 50 µm, from about 50 µm to about 100 µm, from about 100 µm to about 500 µm, from about 500 µm to about 1.0 mm, from about 1.0 mm to about 2.0 mm, from about 2.0 mm to about 10.0 mm, or from about 10.0 mm to about 20.0 mm. However, the disclosure is not so limited and the dimension $D_1$ of the struts 204 may be different than (e.g., less than, greater than) the dimension $D_1$ described above.

A length $L_s$ of the struts 204 may be within a range from about 5 µm to about 40.0 mm, such as from about 5 µm to about 10 µm, from about 10 µm to about 50 µm, from about 50 µm to about 100 µm, from about 100 µm to about 250 µm, from about 250 µm to about 500 µm, from about 500 µm to about 1,000 µm (about 1.0 mm), from about 1.0 mm to about 2.0 mm, from about 2.0 mm to about 3.0 mm, from about 3.0 mm to about 5.0 mm, from about 5.0 mm to about 10.0 mm, from about 10.0 mm to about 20.0 mm, from about 20.0 mm to about 30.0 mm, or from about 30.0 mm to about 40.0 mm. However, the disclosure is not so limited and the length $L_s$ of the struts 204 may be different than (e.g., less than, greater than) the length $L_s$ of the struts 204 described above.

An angle θ between a longitudinal axis L of struts 204 intersecting at a node 206 may be at least partially defined by cell length $L_c$ and the length $L_s$ of the struts 204. The angle θ may be within a range from about 15° to about 90°, such as from about 15° to about 30°, from about 30° to about 45°, from about 45° to about 60°, from about 60° to about 75°, or from about 75° to about 90°.

A ratio between a length $L_s$ of the struts 204 and the dimension $D_1$ of the struts 204 (e.g., an aspect ratio of the struts 204) may be within a range from about 2:1 to about 1000:1, such as from about 2:1 to about 3:1, from about 3:1 to about 5:1, from about 5:1 to about 10:1, from about 10:1 to about 50:1, from about 50:1 to about 100:1, from about 100:1 to about 200:1, from about 200:1 to about 500:1, or from about 500:1 to about 1,000:1. In some embodiments, the ratio of the length $L_s$ of the struts 204 and the dimension $D_1$ of the struts 204 is within a range of from about 2:1 to about 20:1.

The lattice structure 200 may exhibit a cell density within a range from about 5 volume percent to about 50 volume percent of a fully dense volume, such as from about 5 volume percent to about 10 volume percent, from about 10 volume percent to about 20 volume percent, from about 20 volume percent to about 30 volume percent, from about 30 volume percent to about 40 volume percent, or from about 40 volume percent to about 50 volume percent of a fully dense volume.

In some embodiments, such as where one or more of the length $L_c$ of the unit cells 202, the width $W_c$ of the unit cells 202, and the height H of the unit cells 202 differ from the other of the length $L_c$ of the unit cells 202, the width $W_c$ of the unit cells 202, and the height H of the unit cells 202, the length $L_s$ of the struts 204 may differ in one or more directions. In other words, the length $L_s$ of the struts 204 may differ in one or more directions (e.g., one of the X-direction, the Y-direction, the Z-direction, a diagonal direction) from the length $L_s$ of the struts 204 in one or more additional directions.

In some embodiments, one or more of the length $L_c$ of the unit cells 202, the width $W_c$ of the unit cells 202, the height H of the unit cells 202, the dimension $D_1$ of the struts 204, the length $L_s$ of the struts 204, the angle θ between the struts 204, and the ratio of the length $L_s$ of the struts 204 to the dimension $D_1$ of the struts 204 may be modified by exposure to one or more conditions and the modification may correspond to a change in the one or more properties of the lattice structure 200.

With continued reference to FIG. 2B, in some embodiments, the unit cell 202 may include a first strut 204a and a second strut 204b neighboring the first strut 204a. In some embodiments, a longitudinal axis L of the first strut 204a is the same as a longitudinal axis L of the second strut 204b. In other words, the longitudinal axis L of the first strut 204a comprises the same line as the longitudinal axis L of the second strut 204b. In some embodiments, a material composition of the first strut 204a is substantially the same as the material composition of the second strut 204b. In other embodiments, the material composition of the first strut 204a is different than the material composition of the second strut 204b.

In some embodiments, the first strut 204a is configured to exhibit a response (e.g., a displacement) to one or more conditions. In some embodiments, the response of the first strut 204a is configured to be in the same direction as a response of the neighboring second strut 204b. In some such embodiments, the response of the second strut 204b may at least partially compensate for the response of the first strut 204a.

In other embodiments, the response of the first strut 204a is configured to be opposite (e.g., in the opposite direction)

as a response of a neighboring second strut 204b. In some such embodiments, by measuring the displacement of the neighboring second strut 204b, the response of the first strut 204a to the one or more conditions is amplified. Stated another way, forming neighboring struts 204 (e.g., the first strut 204a and the second strut 204b) to exhibit the opposing responses facilitates amplification of the response and may be used to accelerate measurement of time-dependent phenomena, such as creep (e.g., irradiation assisted creep).

In some embodiments, the first strut 204a is formed of a piezoelectric material and the second strut 204b neighboring the first strut 204a (e.g., in contact with the first strut 204a) is formed of another material. In some embodiments, displacement of the first strut 204a may affect the deformation of the second strut 204b. In some such embodiments, measurement of the deformation (e.g., displacement, elongation, a reduction in length) of the first strut 204a may include determination of the deformation of the second strut 204b. In some embodiments, the another material comprises a piezoelectric material having a different composition than the piezoelectric material of the first strut 204a. In other embodiments, the another material comprises a non-piezoelectric material, such as one or more of metallic alloys (e.g., steel (e.g., stainless steel, such as 316L stainless steel), alloys containing iron, molybdenum, zirconium, nickel, aluminum, niobium), iron, nickel, molybdenum, nitrogen, zirconium, aluminum, zircaloy, graphite, hafnium, tin, niobium, non-metallic materials, such as ceramics (e.g., silicon carbide) and graphite.

By way of non-limiting example, elongation of the first strut 204a in a direction of the second strut 204b may affect the displacement of the second strut 204b. The sum of the displacement of the first strut 204a relative to the second strut 204b may be determined by measuring at least one electrical property of the piezoelectric material of the first strut 204a. In some such embodiments, the measurement of time-dependent phenomena may be accelerated by summing the responses of neighboring struts 204.

Although FIG. 2A and FIG. 2B have been described and illustrated as comprising a lattice structure 200 having unit cells 202 having a particular configuration, geometry, and orientation, the disclosure is not so limited. In other embodiments, the lattice structure 200 and the unit cells 202 having a different configuration.

Figure 3B:
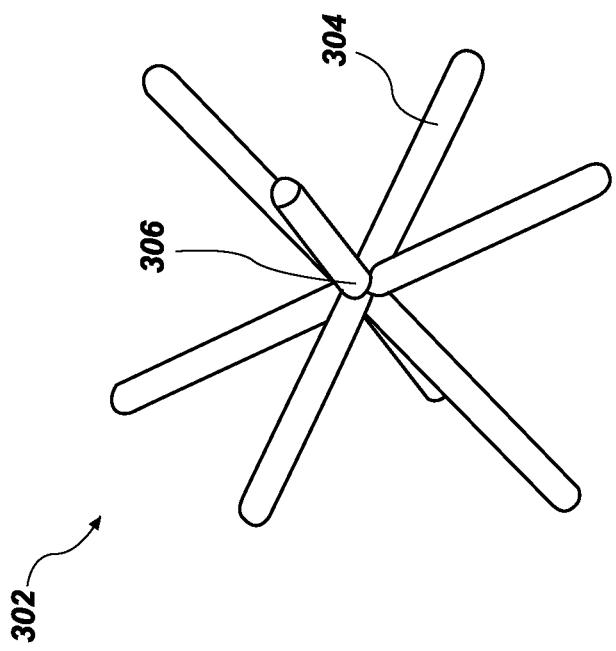
FIG. 3B is a simplified perspective view of one of the body-centered cubic cells of the lattice structure of FIG. 3A, in accordance with embodiments of the disclosure.
Figure 3A:
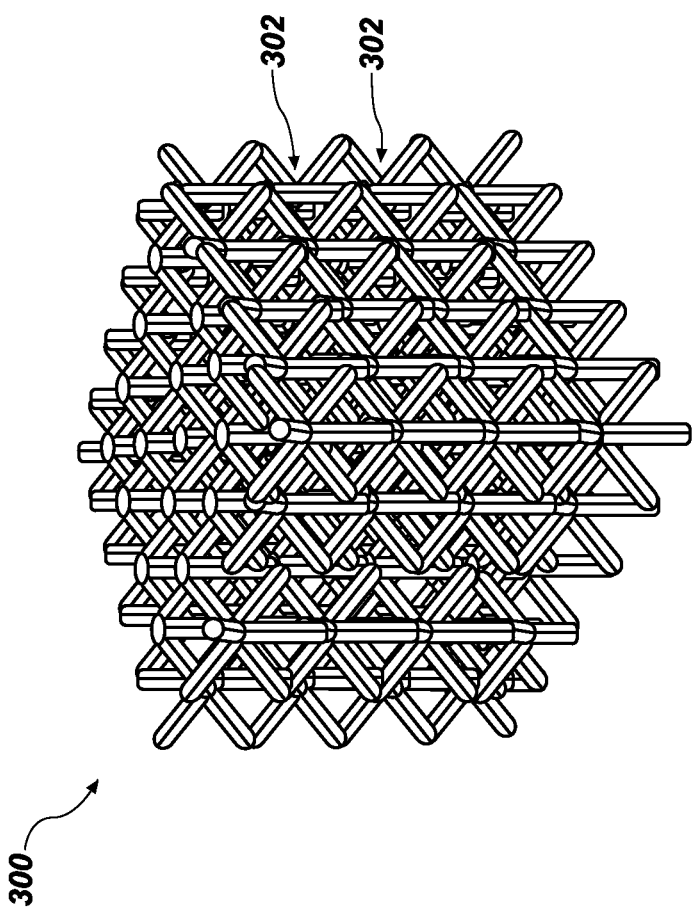
FIG. 3A is a simplified partial perspective view of a lattice structure comprising a plurality of body-centered cubic cells, in accordance with additional embodiments of the disclosure.

FIG. 3A is a simplified partial perspective view of a lattice structure 300 comprising a plurality of body-centered cubic cells 302 and FIG. 3B is a simplified perspective view of one of the body-centered cubic cell 302 of the lattice structure 300, in accordance with additional embodiments of the disclosure.

With combined reference to FIG. 3A and FIG. 3B, the body-centered cubic (BCC) cell 302 may include struts 304 extending from a node 306. In some embodiments, the body-centered cubic cell 302 includes eight (8) struts 304 extending from the node 306. It will be appreciated that when the body-centered cubic cells 302 are arranged in a lattice structure including a plurality of body-centered cubic cells 302, each strut 304 may connect and extend between nodes 306 (e.g., may terminate at a node of a neighboring body-centered cubic cell 302).

As described above with reference to the lattice structure 200, in some embodiments, neighboring unit cells (e.g., body-centered cubic cells 302) may be formed of different material compositions. In some embodiments, neighboring struts 304 may be formed of different material compositions. In some embodiments, at least some of the struts 304 are formed of a piezoelectric material and at least one electrical property of the piezoelectric material may be measured to determine the deformation (e.g., displacement, elongation, shortening of the struts 304) of the lattice structure 300 in one or more directions.

Figure 4B:
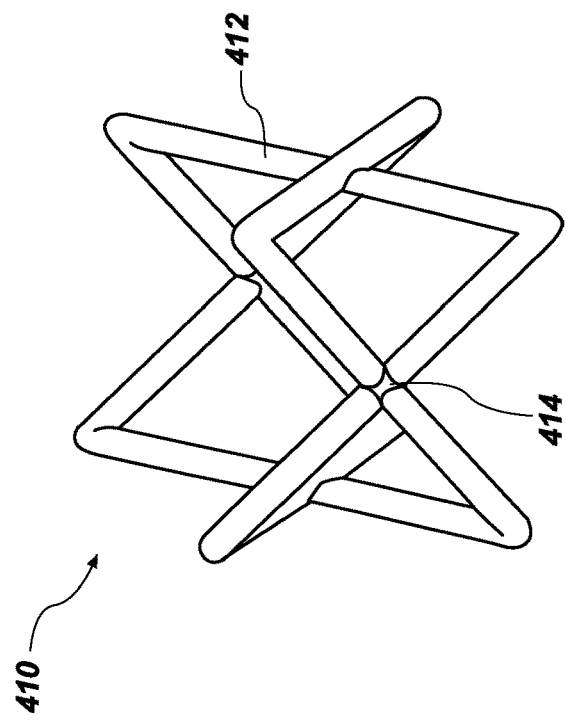
FIG. 4B is a simplified perspective view of a face-centered cubic cell, in accordance with additional embodiments of the disclosure.
Figure 4A:
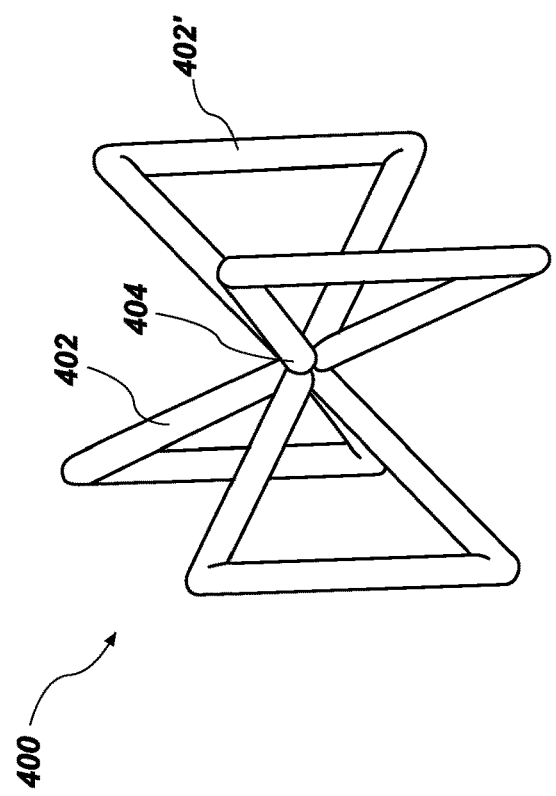
FIG. 4A is a simplified perspective view of a reinforced body-centered cubic cell, in accordance with embodiments of the disclosure.

FIG. 4A is a simplified perspective view of a reinforced body-centered cubic cell (RBCC) (also referred to as a body centered cubic cell including z-struts (BCCZ)), in accordance with embodiments of the disclosure. The unit cell 400 may be substantially similar to the body-centered cubic cell 302 of FIG. 3A and FIG. 3B, except that the unit cell 400 may include additional struts 402'. For example, the unit cell 400 may include additional struts 402' vertically extending between struts 402, the vertically extending additional struts 402' not connected to a node 404. In some embodiments, the additional struts 402' that are not connected to a node 404 may reinforce the unit cell 400. The unit cell 400 may be used in the lattice structure 300 (FIG. 3A) and may replace at least some of (e.g., all of, only a portion of) the body-centered cubic cells 302 (FIG. 3A, FIG. 3B) of the lattice structure 300, or at least some of (e.g., all of, only a portion of) the unit cells 202 (FIG. 2A, FIG. 2B) of the lattice structure 200 (FIG. 2A, FIG. 2B).

FIG. 4B is a simplified perspective view of a face-centered cubic (FCC) cell 410, in accordance with additional embodiments of the disclosure. The face-centered cubic cell 410 may be used in the lattice structure 300 (FIG. 3A) and may replace at least some of (e.g., all of, only a portion of) the body-centered cubic cells 302 (FIG. 3A, FIG. 3B) of the lattice structure 300, or at least some of (e.g., all of, only a portion of) the unit cells 202 (FIG. 2A, FIG. 2B) of the lattice structure 200 (FIG. 2A, FIG. 2B).

The face-centered cubic cell 410 may include struts 412 extending from nodes 414 that are located in the center of faces the face-centered cubic cell 410 (as opposed to in the center of the body of the cubic cell, as the body-centered cubic cells 302 of FIG. 3A and FIG. 3B).

Figure 4D:
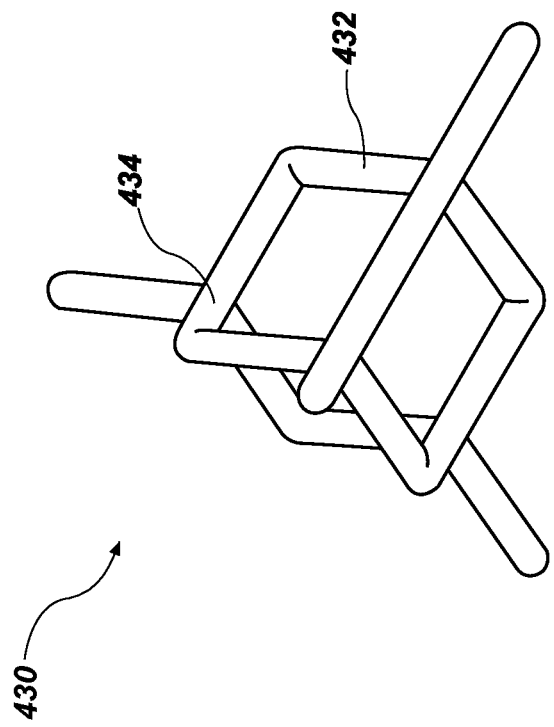
FIG. 4D is a simplified perspective view of a diamond unit cell, in accordance with embodiments of the disclosure.
Figure 4C:
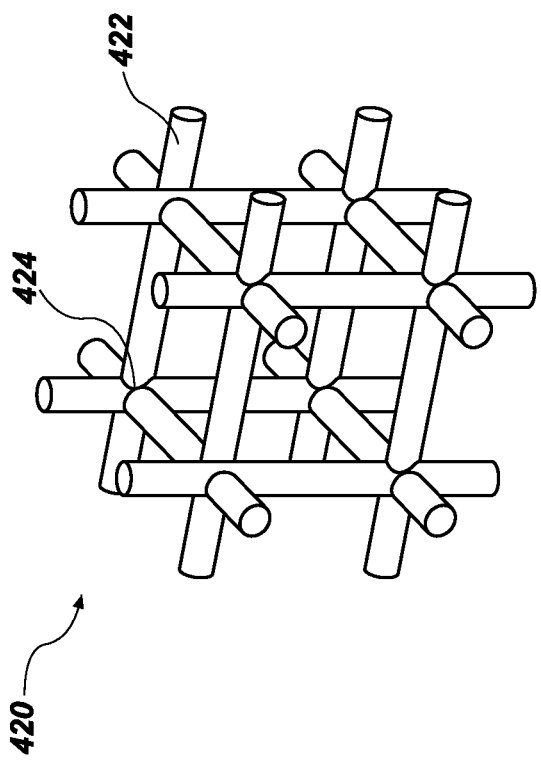
FIG. 4C is a simplified perspective view of a cubic unit cell, in accordance with embodiments of the disclosure.

FIG. 4C is a simplified perspective view of a cubic unit cell 420, in accordance with embodiments of the disclosure. The cubic unit cell 420 may be used in the lattice structure 300 (FIG. 3A) and may replace at least some of (e.g., all of, only a portion of) the body-centered cubic cells 302 (FIG. 3A, FIG. 3B) of the lattice structure 300, or at least some of (e.g., all of, only a portion of) the unit cells 202 (FIG. 2A, FIG. 2B) of the lattice structure 200 (FIG. 2A, FIG. 2B). The cubic unit cell 420 may include struts 422 extending from nodes 424 that are located in the center of faces of the cubic unit cell 420 (as opposed to in the center of the body of the cubic unit cell, as the body-centered cubic cells 302 of FIG. 3A and FIG. 3B).

FIG. 4D is a simplified perspective view of a diamond unit cell 430, in accordance with embodiments of the disclosure. The diamond unit cell 430 may be used in the lattice structure 300 (FIG. 3A) and may replace at least some of (e.g., all of, only a portion of) the body-centered cubic cells 302 (FIG. 3A, FIG. 3B) of the lattice structure 300, or at least some of (e.g., all of, only a portion of) the unit cells 202 (FIG. 2A, FIG. 2B) of the lattice structure 200 (FIG. 2A, FIG. 2B). The diamond unit cell 430 may include struts 432 extending from nodes 434 that are located in the center of faces the diamond unit cell 430 (as opposed to in the center of the body of the diamond unit cell, as the body-centered cubic cells 302 of FIG. 3A and FIG. 3B).

As described above with reference to the lattice structure 200, in some embodiments, neighboring unit cells (e.g., the unit cell 400, the face-centered cubic cell 410, the cubic unit cell 420, the diamond unit cell 430) may be formed of different material compositions. In some embodiments, neighboring struts 402, 412, 422, 432 may be formed of different material compositions. In some embodiments, at least some of the struts 402, 412, 422, 432 are formed of a piezoelectric material and at least one electrical property of the piezoelectric material may be measured to determine the deformation (e.g., displacement, elongation, shortening of the struts 402, 412, 422, 432) of the lattice structure formed from the cells 400, 410, 420, 430 in one or more directions.

Figure 5D:
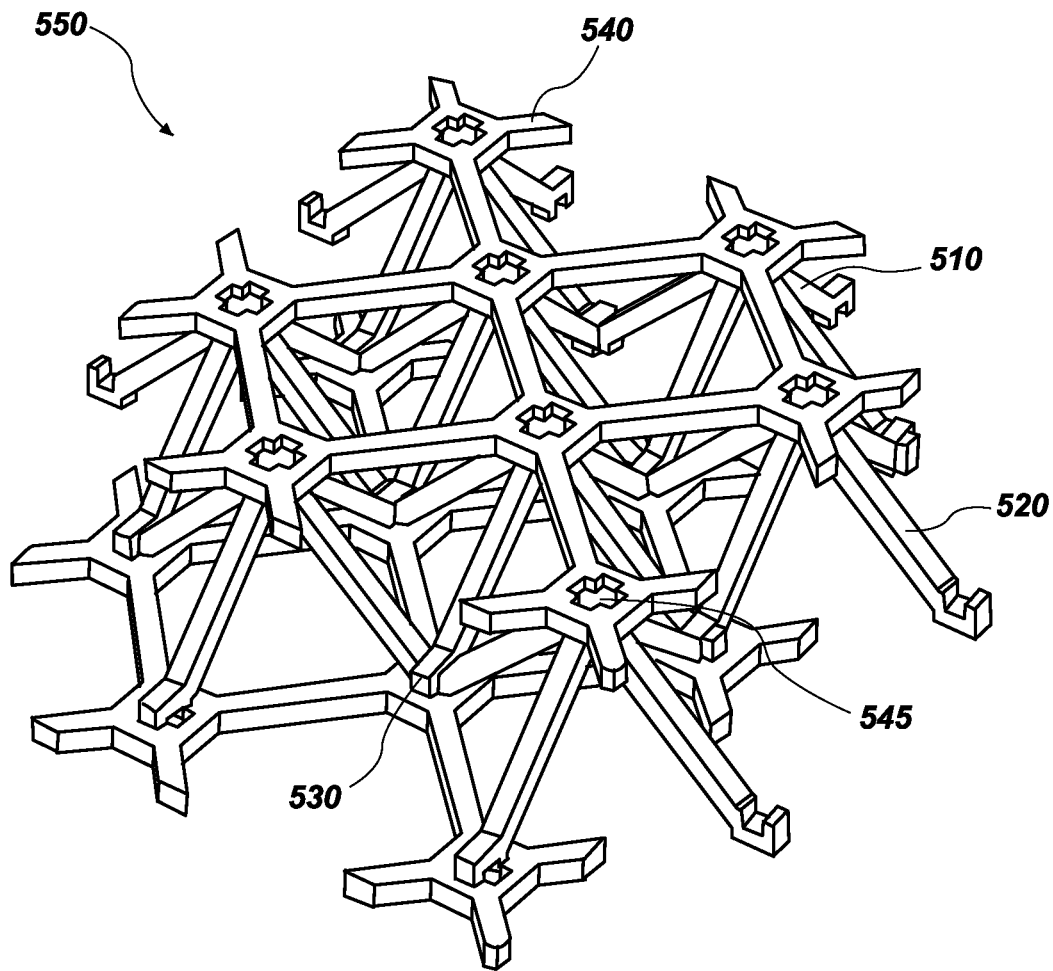
FIG. 5D is a simplified perspective view of a snap-through lattice structure comprising face sheets configured to couple to a connection region, in accordance with embodiments of the disclosure.

In some embodiments, the lattice structure comprises a so-called "snap through" lattice structure, also referred to in the art as a "snap-through" lattice structure. FIG. 5A is a simplified partial perspective view of a snap-through lattice structure 500 comprising a first truss 510 configured to snap-through to a second truss 520, in accordance with embodiments of the disclosure. FIG. 5B is a simplified perspective view of a snap-fit cell 525 wherein the first truss 510 is connected (e.g., snap-through) to the second truss 520 to form the snap-fit cell 525. FIG. 5C is a simplified perspective view of a snap-through lattice structure 535 after several of the first trusses 510 are connected to corresponding second trusses 520.

With combined reference to FIG. 5A through FIG. 5C, the first trusses 510 may include a first recessed portion 512 configured to be received within a second recessed portion 522 of the second trusses 520 to connect the first trusses 510 to the second trusses 520 and form a connection region 530 between the first trusses 510 and respective ones of the second trusses 520. A dimension of the first recessed portions 512 of the first trusses 510 may correspond to a dimension of the second recessed portions 522 of the second trusses 520.

In some embodiments, different layers of the snap-through lattice structure 500 are connected by a face sheet. For example, with reference to FIG. 5D, a snap-through lattice structure 550 comprises face sheets 540 configured to couple to the connection region 530, in accordance with embodiments of the disclosure. The face sheets 540 may comprise openings 545 at locations corresponding to the connection regions 530 and configured to receive the connection regions 530 to connect the face sheet 540 to the first trusses 510 and the second trusses 520 at the connection regions 530.

As described above with reference to the lattice structure 200, in some embodiments, neighboring snap-fit cell 525 may be formed of different material compositions. In some embodiments, the trusses (e.g., the first trusses 510, the second trusses 520) may be formed of different material compositions. In some embodiments, the first trusses 510 are formed of a piezoelectric material and at least one electrical property of the piezoelectric material may be measured to determine the deformation (e.g., displacement, elongation, shortening of the first trusses 510) of the snap-fit cell 525 in one or more directions.

Figure 6:
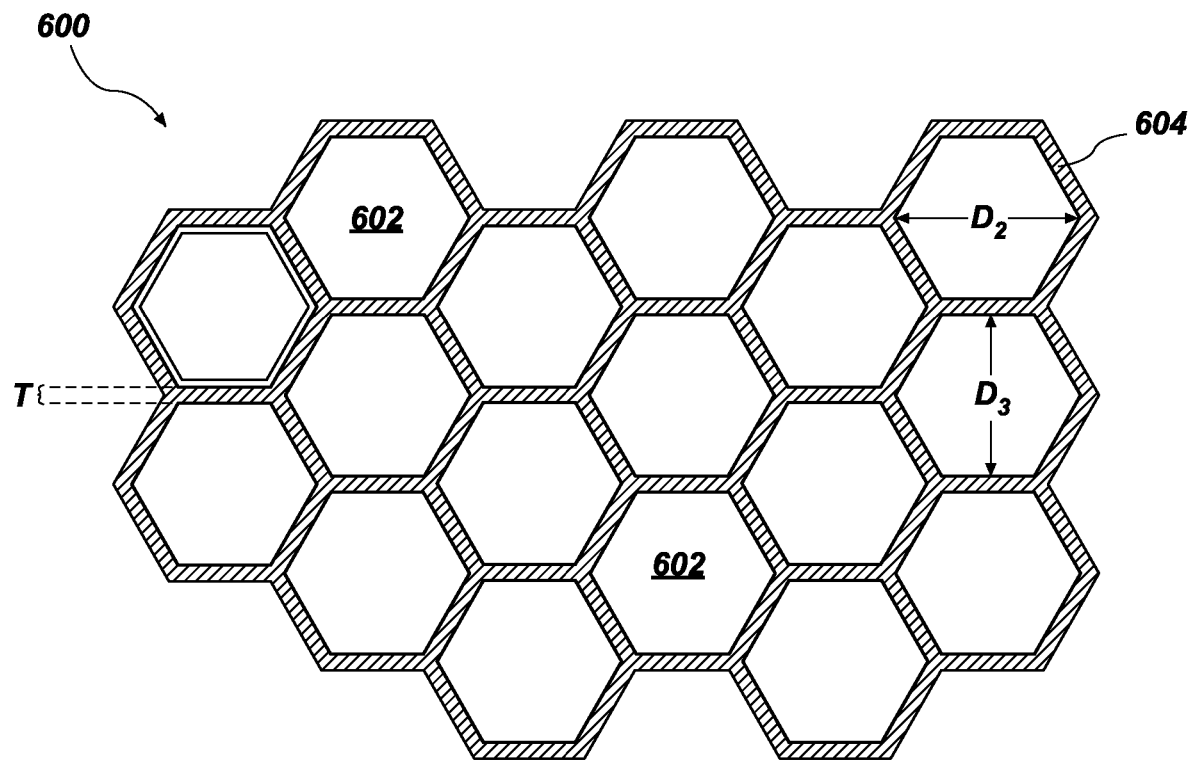
FIG. 6 is a simplified partial top down view of a honeycomb structure including cells having a honeycomb shape (e.g., a hexagonal shape), in accordance with embodiments of the disclosure.

In some embodiments, the lattice structure comprises one or more honeycomb cells. Honeycomb cells may differ from unit cells of lattice structure by including, for example, solid material connecting faces of the unit cell as opposed to empty spaces between faces defined by the struts. FIG. 6 is a simplified partial top down view of a honeycomb structure 600 including cells 602 having a honeycomb shape (e.g., a hexagonal shape), in accordance with embodiments of the disclosure. The cells 602 may be arranged in a pattern or may be randomly oriented. In some embodiments, each cell 602 exhibits substantially the same dimension and shape. In the embodiment illustrated in FIG. 6, the cells 602 have a hexagonal shape. However, the disclosure is not so limited and the cells 602 may be a different shape, such as triangular, rectangular, square, diamond, circular, oval, pentagonal, octagonal, etc. In some embodiments, at least some of the cells 602 may exhibit a first shape and at least some of the cells 602 may exhibit a second, different shape.

Each cell 602 may be defined by walls 604. Each cell 602 may have a dimension $D_2$ defining a size, such as, for example, a width of the cell 602. In some embodiments, the dimension $D_2$ of the cells 602 may be substantially uniform along one or more axes of the honeycomb structure 600. In other embodiments, the honeycomb structure 600 may include cells 602 of varying size along at least one axis of honeycomb structure 600. In some such embodiments, at least some of the cells 602 have a first size and at least other of the cells 602 have a second size.

A dimension $D_3$ of the cells 602 may define, for example, a length of the cells 602. In some embodiments, the dimension $D_3$ of the cells 602 may be substantially uniform along one or more axes of the honeycomb structure 600. In some embodiments, the honeycomb structure 600 may include cells 602 of varying size along at least one axis of the honeycomb structure 600. In some such embodiments, at least some of the cells 602 have a first size and at least other of the cells 602 have a second size.

Each of the dimension $D_2$ and the dimension $D_3$ may independently be between about 0.5 mm and about 25.4 mm, such as between about 0.5 mm and about 1.0 mm, between about 1.0 mm and about 1.5 mm, between about 1.5 mm and about 2.0 mm, between about 2.0 mm and about 2.5 mm, between about 2.5 mm and about 3.0 mm, between about 3.0 mm and about 4.0 mm, between about 4.0 mm and about 5.0 mm, between about 5.0 mm and about 7.5 mm, between about 7.5 mm and about 10.0 mm, between about 10.0 mm and about 15.0 mm, between about 15.0 mm and about 20.0 mm, or between about 20.0 mm and about 25.4 mm. In some embodiments, $D_2$ is equal to about $D_3$. In other embodiments, dimension $D_2$ is greater than $D_3$. In yet other embodiments, $D_3$ is greater than $D_2$.

In some embodiments, a thickness T of the walls 604 of each cell 602 may be substantially uniform. In other words, the thickness T of the walls 604 may be substantially the same for each of the cells 602. By way of nonlimiting example, the thickness T may be between about 300 μm and about 2.0 mm, such as from about 300 μm to about 400 μm, from about 400 μm to about 500 μm, from about 500 μm to about 1.0 mm, or from about 1.0 mm to about 2.0 mm. However, the disclosure is not so limited and the thickness T may be different than those described above. Further, the thickness T of a wall of a cell 602 in one direction may be different than the thickness T in another direction. In other words, wall thickness T may be different for two or more walls of a single cell 602. In some embodiments, the thickness T of the walls 604 may change in one or more directions.

The lattice structures (e.g., lattice structures 200, 300, 550) and the cells (e.g., cells 202, 302, 400, 410, 420, 430, 525, 602) may be formed from one or more materials from which a nuclear reactor may be formed. By way of nonlimiting example, the lattice structures and cells may be formed from one or more of metallic alloys (e.g., steel (e.g., stainless steel, such as 316L stainless steel), alloys containing iron, molybdenum, zirconium, nickel, aluminum, niobium), iron, nickel, molybdenum, nitrogen, zirconium, aluminum, zircaloy, graphite, hafnium, tin, niobium-non-metallic materials, such as ceramics (e.g., silicon carbide) and graphite. In some embodiments, the lattice structures and cells may be formed of and include one or more metals and one or more non-metallic materials.

In some embodiments, and as described above, at least some of the cells (e.g., cells 202, 302, 400, 410, 420, 430, 525, 602) of the lattice structures (e.g., lattice structures 200, 300, 550) may exhibit a first composition and at least other of the cells (e.g., cells 202, 302, 400, 410, 420, 430, 525, 602) of the lattice structures (e.g., lattice structures 200, 300, 550) comprises a different material composition, such as a piezoelectric material.

In some embodiments, at least some of the cells (e.g., cells 202, 302, 400, 410, 420, 430, 525, 602) of the lattice structures (e.g., lattice structures 200, 300, 550) may exhibit a first shape (geometry) and at least some cells of the lattice structure may exhibit a different shape. For example, in some embodiments, one or more of the cells of a lattice structure may comprise one of octet truss unit cells, body centered cubic cells, a reinforced body centered cubic cells, face-centered cubic cells, cubic cells (e.g., simple cubic cells), diamond cells, octahedral cells, snap-through cells, and honeycomb cells and other cells of the lattice structure may comprise an additional one of octet truss unit cells, body centered cubic cells, a reinforced body centered cubic cells, face-centered cubic cells, cubic cells (e.g., simple cubic cells), diamond cells, octahedral cells, snap-through cells, and honeycomb cells.

Although the lattice structures (e.g., lattice structures 200, 300, 550) have been described and illustrated as comprising unit cells (e.g., cells 202, 302, 400, 410, 420, 430, 525, 602) having a uniform size and shape, the disclosure is not so limited. In some embodiments, the lattice structures may exhibit a gradient in one or more properties (e.g., a geometry of the unit cells, a unit cell size, a unit cell shape, a strut length, a strut dimension (e.g., diameter), strut material density, strut surface roughness, a cell density, a ratio between a length of the struts and the dimension of the struts, and a material composition). In other words, the one or more properties may vary in one or more directions. In some embodiments, the one or more properties may vary in the one or more directions to vary one or more properties in the one or more directions. In some embodiments, varying the one or more properties in one or more directions may facilitate an increased sensitivity of the lattice structure to one or more properties in the one or more directions relative to other directions.

In some embodiments, the lattice structures (e.g., lattice structures 200, 300, 550) and the cells (e.g., cells 202, 302, 400, 410, 420, 430, 525, 602) may be formed by additive manufacturing. Additive manufacturing may facilitate forming the cells to have a desired geometry and size, and facilitate formation of the lattice structures having a porous structure compared to conventional methods of fabrication, such as casting or subtractive manufacturing. Since additive manufacturing builds the lattice structure layer by layer, lattice structures with complex geometries may be fabricated by additive manufacturing. In addition, conventional manufacturing methods may be used and include machining individual cells of a lattice structure, followed by joining (e.g., welding) the individual cells of the lattice structure. However, methods of joining the individual cells may lead to cell deformation and negatively affect the stability of the lattice structure. Further, conventional manufacturing techniques may not able to achieve the cell sizes and lattice properties described herein.

The additive manufacturing methods for forming the lattice structure may include, for example, fused deposition modeling (FDM), powder bed fusion (PBF), selective laser melting (SLM), selective laser sintering (SLS), electron beam melting (EBM), binder jetting, or other additive manufacturing methods.

Additive manufacturing of lattice structures may significantly outperform lattice structures produced by alternative manufacturing methods with equivalent porosity, particularly due to the greater geometric control and predictability provided by additive manufacturing fabrication. Additive manufacturing may facilitate tailoring of each unit cell and each strut of the lattice structure, to facilitate optimization of one or more desired properties of the lattice structure.

Accordingly, lattice structures may be used in a test capsule for quantifying a material from which the lattice structures are formed for use in an environment to which the test capsule is exposed. The lattice structures may be sized, shaped, and configured to facilitate amplification of a condition to which the lattice structures are exposed and may facilitate measurement of time-dependent properties (e.g., irradiation assisted creep, irradiation induced swelling) over a shorter duration compared to conventional methods of measuring time-dependent properties. Stated another way, the lattice structures may be designed to amplify the creep response of the materials from which the lattice structures are formed to facilitate an indication of the creep by one or more of a distortion of the lattice structure of a change in shape or volume of the lattice structure. In some embodiments, the lattice structures are used in material qualification for use in environments that cause one or more of creep, irradiation assisted creep, fatigue, stress corrosion cracking, radiation damage, breakaway growth, irradiation induced swelling, deformation rates, radiation hardening and embrittlement, and additional radiation effects. In some embodiments, the lattice structures are used for material qualification for materials and structures to be used in a nuclear reactor environment. Use of the lattice structures may substantially accelerate the material qualification of the materials from which the lattice structures are formed, such as by more than one year, more than three years, or even more than five years compared to conventional methods of material qualification which require several additional years of exposure prior to testing and examination compared to the lattice structures according to embodiments of the disclosure. Stated another way, the duration over which the lattice structures may be exposed to the irradiation conditions may be a fraction of the duration that conventional materials must be exposed to the irradiation conditions to measure the effect of the irradiation on the materials.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A test capsule for measuring at least one property of a material exposed to nuclear radiation, the test capsule comprising:
   at least one lattice structure configured to exhibit a change in at least one property responsive to exposure to nuclear radiation, the at least one lattice structure comprising:
   a first strut; and
   a second strut connected to the first strut at a node.

2. The test capsule of claim 1, wherein the second strut comprises a different material composition than the first strut.

3. The test capsule of claim 1, wherein the first strut comprises a piezoelectric material.

4. The test capsule of claim 1, further comprising an additional lattice structure comprising a different material composition than the at least one lattice structure and in contact with the at least one lattice structure.

5. The test capsule of claim 1, further comprising an additional lattice structure comprising a different geometry than the at least one lattice structure and in contact with the at least one lattice structure.

6. The test capsule of claim 1, wherein the first strut is configured to be deformed in a direction opposite a direction in which the second strut is configured to be deformed responsive to exposure to nuclear radiation.

7. The test capsule of claim 1, wherein the first strut is configured to be deformed in a same direction as the second strut is configured to be deformed responsive to exposure to nuclear radiation.

8. The test capsule of claim 1, wherein the at least one lattice structure comprises:
   a first unit cell comprising the first strut and the second strut; and
   a second unit cell connected to the first unit cell at an additional node.

9. The test capsule of claim 8, wherein the second unit cell comprises a different material composition than the first unit cell.

10. A test capsule for measuring a change in at least one property of a material responsive to exposure to nuclear radiation, the test capsule comprising:
    a shell defining a volume; and
    at least one lattice structure within the volume and configured to exhibit a change in at least one property responsive to exposure to nuclear radiation.

11. The test capsule of claim 10, wherein the at least one lattice structure comprises:
    a first lattice structure; and
    a second lattice structure.

12. The test capsule of claim 11, wherein the second lattice structure exhibits a geometry different from a geometry of the first lattice structure.

13. The test capsule of claim 12, wherein the second lattice structure directly contacts the first lattice structure.

14. The test capsule of claim 10, wherein the at least one lattice structure comprises unit cells having one or more of an octet truss structure, a body centered cubic structure, a reinforced body centered cubic structure, a face-centered cubic structure, a diamond structure, an octahedral structure, and a snap-through structure.

15. The test capsule of claim 10, wherein the at least one lattice structure comprises unit cells defined by struts extending from nodes.

16. The test capsule of claim 15, wherein a ratio of a length of the struts to a diameter of the struts is within a range from about 2:1 to about 20:1.

17. The test capsule of claim 10, wherein the at least one lattice structure comprises unit cells, a size of the unit cells varying in one or more directions.

18. The test capsule of claim 10, wherein the at least one lattice structure comprises one or more of steel, iron, nickel, molybdenum, nitrogen, zirconium, aluminum, zircaloy, graphite, hafnium, tin, and niobium.

19. The test capsule of claim 10, wherein the change of at least one property of the at least one lattice structure comprises a change in shape, a change in volume, or both responsive to the exposure to the nuclear radiation.

20. A method of qualifying a material for use in a nuclear reactor, the method comprising:
    placing at least one lattice structure within a test capsule, the at least one lattice structure comprising struts connected to nodes;
    disposing the test capsule in a nuclear reactor and exposing the test capsule to radiation for a duration of time;
    after the duration of time, removing the test capsule from the nuclear reactor; and
    measuring a displacement of at least one of the struts of the at least one lattice structure to measure at least one property of the at least one lattice structure.

21. The method of claim 20, wherein measuring a displacement of the at least one lattice structure to measure the at least one property of the lattice structure comprises determining an irradiated assisted creep of the lattice structure.

* * * * *